United States Patent
Handshaw et al.

(10) Patent No.: US 10,715,712 B2
(45) Date of Patent: Jul. 14, 2020

(54) BARCODE READERS AND COMPONENT ARRANGEMENTS THEREOF

(71) Applicant: SYMBOL TECHNOLOGIES, LLC, Lincolnshire, IL (US)

(72) Inventors: Darran Michael Handshaw, Sound Beach, NY (US); Vladimir Gurevich, Great Neck, NY (US); Igor Vinogradov, Oakdale, NY (US); Mark D. Anderson, Dix Hills, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 16/193,778

(22) Filed: Nov. 16, 2018

(65) Prior Publication Data

US 2019/0104241 A1    Apr. 4, 2019

Related U.S. Application Data

(63) Continuation of application No. 15/140,644, filed on Apr. 28, 2016, now Pat. No. 10,142,531.

(51) Int. Cl.
| | |
|---|---|
| *H04N 5/225* | (2006.01) |
| *G06K 7/10* | (2006.01) |
| *G01C 15/10* | (2006.01) |
| *H04N 1/024* | (2006.01) |
| *H04N 1/107* | (2006.01) |

(Continued)

(52) U.S. Cl.
CPC ............ *H04N 5/2256* (2013.01); *G01C 3/00* (2013.01); *G01C 15/105* (2013.01); *G06K 7/10722* (2013.01); *G06K 7/10831* (2013.01); *G06K 7/10881* (2013.01); *H04N 1/024* (2013.01); *H04N 1/107* (2013.01); *H04N 5/335* (2013.01); *G06K 2207/1011* (2013.01); *H04N 2201/3269* (2013.01)

(58) Field of Classification Search
None
See application file for complete search history.

(56) References Cited

U.S. PATENT DOCUMENTS

| | | | |
|---|---|---|---|
| 6,234,395 B1 * | 5/2001 | Chadima, Jr. ...... | G06K 7/10594 235/462.01 |
| 6,340,114 B1 * | 1/2002 | Correa ............... | G06K 7/10722 235/462.01 |

(Continued)

*Primary Examiner* — Chikaodili E Anyikire
(74) *Attorney, Agent, or Firm* — Yuri Astvatsaturov

(57) ABSTRACT

Embodiments of the preset invention include a barcode reader that comprises a housing having a handgrip portion and an upper body portion, a first printed circuit board (PCB) extending into the upper body portion, and an imaging module positioned within the upper body portion. In this instance, the imaging module includes an imaging system having an imager and an imaging lens assembly, the imaging system having a field of view with a central imaging axis passing through a window in the upper body portion and lying on a horizontal plane. The imaging module further includes an aiming light system configured to emit an aiming light pattern, the aiming light system offset from the imaging system along the horizontal plane. Furthermore, the components of the barcode reader are arranged such that the first PCB is positioned at an oblique angle relative to the central imaging axis.

7 Claims, 16 Drawing Sheets

(51) Int. Cl.
*G01C 3/00* (2006.01)
*H04N 5/335* (2011.01)

(56) References Cited

U.S. PATENT DOCUMENTS

2007/0108284 A1* 5/2007 Pankow ............. G06K 7/10851
  235/454
2009/0272808 A1* 11/2009 Drzymala .......... G06K 7/10702
  235/462.21
2012/0168508 A1* 7/2012 Prasad ............... G06K 7/10544
  235/455

* cited by examiner

BARCODE READERS AND COMPONENT ARRANGEMENTS THEREOF

CROSS-REFERENCE TO RELATED APPLICATION

This application is a continuation of U.S. patent application Ser. No. 15/140,644, filed on Apr. 28, 2016, and incorporated herein by reference in its entirety.

BACKGROUND OF THE INVENTION

The present disclosure relates generally to an imaging module and an imaging reader for, and a method of, reading a target, such as a bar code symbol, to be electro-optically read by image capture over a field of view in a range of working distances away from the module/reader, and, more particularly, to using an aiming mark of an aiming light pattern to substantially center the target in the field of view, especially in a field crowded with targets, and, still more particularly, to enhancing the visibility of the aiming mark to serve as a more prominent visual indicator of a center zone of the field of view.

Solid-state imaging systems or imaging readers have long been used, in both handheld and hands-free modes of operation, in many industries, such as retail, manufacturing, warehousing, distribution, postal, transportation, logistics, etc., to electro-optically read targets, such as one- or two-dimensional bar code symbols to be decoded. A known imaging reader generally includes an imaging module that is mounted in a housing, and that has an aiming light system for projecting a visible aiming light pattern along an aiming axis to visually locate a target within a field of view and, thus, advise an operator which way the reader is to be moved in order to position the aiming light pattern on the target, typically at a center thereof, prior to reading; an illumination system for emitting illumination light toward the target for reflection and scattering therefrom; and an imaging system having a solid-state imager with a sensor array of photocells or light sensors, and an optical assembly for capturing return illumination light scattered and/or reflected from the target being imaged over the field of view centered on an imaging axis, and for projecting the captured illumination light onto the imager to initiate capture of an image of the target. The imager produces electrical signals that are decoded and/or processed by a programmed microprocessor or controller into information related to the target being read, e.g., decoded data identifying the target. The controller is operative for transmitting the decoded data, either via a wireless or wired link, to a remote host for further processing, e.g., price retrieval from a price database to obtain a price for the identified target.

Low cost imagers with rolling shutters are sometimes used to minimize cost, but this advantageously dictates that the aiming system be physically offset horizontally away from the imaging system. This horizontal offset or parallax positions the aiming light pattern to be off-center relative to the imaging axis and off to one side of the reader, and is especially undesirable when targets in the near range close to the reader are to be read, because the operator would be erroneously guided to position the reader such that a part of the target would typically lie outside the field of view, and therefore, the target will often not be centered and read.

It is known to configure the aiming light system in the imaging reader with a laser, a focusing lens, and a pattern shaping optical element, such as a diffractive optical element (DOE), or a refractive optical element (ROE) to project the aiming light pattern as, for example, a pair of crosshairs for placement at the center of the target, or as continuous lines or rows of light spots, for placement on the target to approximately indicate the field of view. Yet, the lasers and the optical components of such laser-based aiming systems are relatively expensive to fabricate and be optically aligned when mounted in the reader, thereby making them unsuitable for low cost, imaging readers. It is also known to configure the aiming light system in the imaging reader with one or more light emitting diodes (LEDs) to project the aiming light pattern as, for example, one or more generally circular spots, or as a single aiming line, for placement on the target. Such aiming light patterns generally indicate approximately where the center of the field of view is, or indicate approximately where the outer boundaries or end limits of the field of view are, but not both simultaneously. In any event, such laser-based and LED-based aiming systems are subject to the same aforementioned horizontal offset positioning error when the imaging and aiming light systems are offset from each other.

It is also known to project onto the target an aiming light pattern having a pair of aiming lines, each with a predetermined brightness, and having linear end portions that partially overlap each other to form an aiming mark having a brightness greater than the predetermined brightness to visually indicate the approximate center zone of the field of view over the range of working distances. Although generally satisfactory for its intended purpose, experience has shown that the aiming mark is not always clear and discernible in all cases, and is not always very visible or sufficiently bright when viewed, for example, against white backgrounds, and/or in brightly lit venues, and/or when text or bar code symbols are introduced into the field of view. Failure to accurately center a target is particularly important when the field of view is crowded with targets, for example, when multiple targets are located closely adjacent one another in a picklist from which warehouse personnel must select and read only those targets corresponding to ordered items that are to be retrieved from a warehouse or like facility.

Accordingly, it would be desirable to more accurately and more prominently indicate the center of the field of view of an imaging reader over a range of working distances despite a horizontal offset between the imaging and aiming light systems of the reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
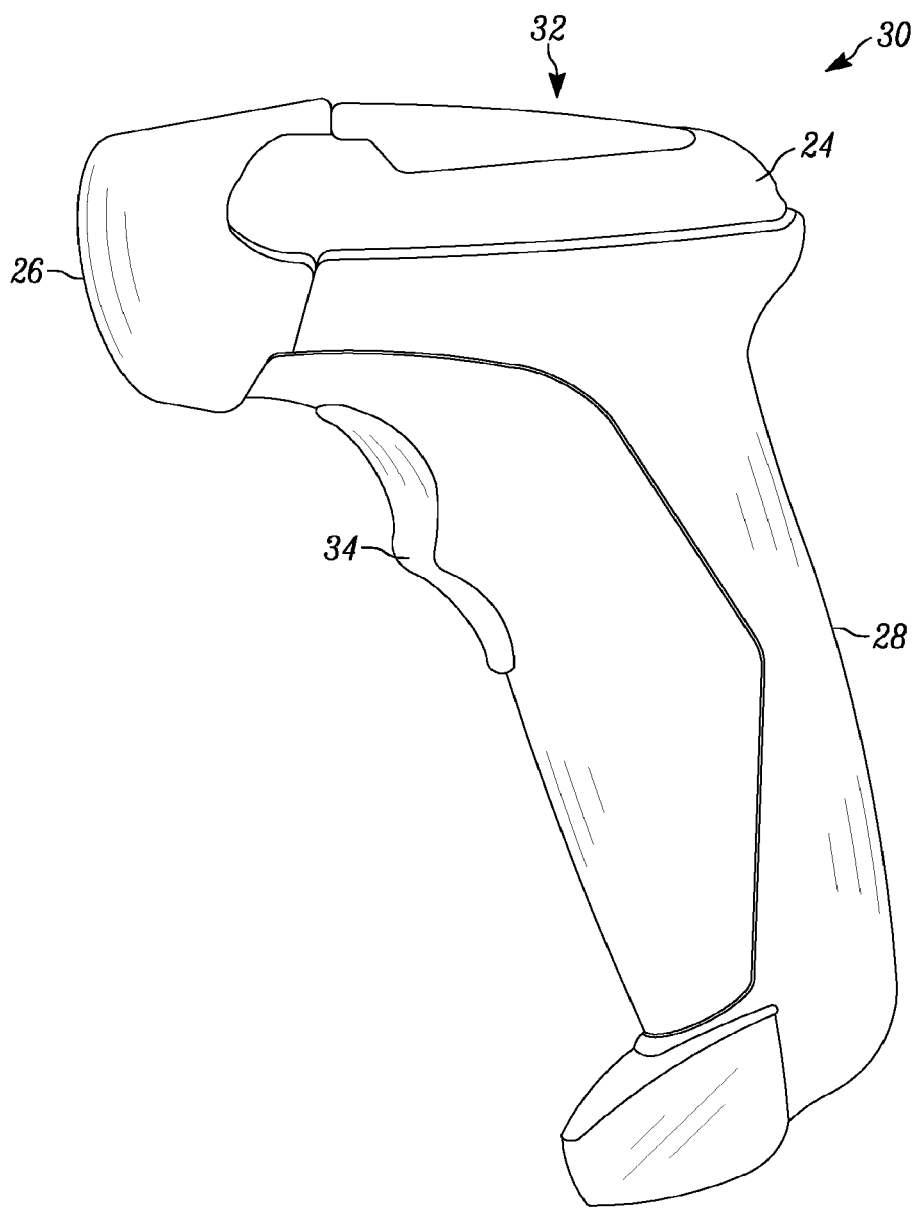
FIG. 1 is a perspective view of an exemplary embodiment of an electro-optical handheld reader for reading targets by image capture in which an imaging module is mounted in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The module, reader and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, an imaging module is operative for reading a target, e.g., a bar code symbol, by image capture over a range of working distances away from the module. The module includes an imaging system that has an imaging sensor, e.g., a two-dimensional, solid-state, sensor, such as a charge coupled device (CCD) or a complementary metal oxide semiconductor (CMOS) array of image sensors, for sensing light returning from the target along an imaging axis over a field of view that extends along mutually orthogonal, horizontal and vertical axes that are generally perpendicular to the imaging axis. The module also includes an aiming light system that is offset from the imaging system, and directs an aiming light pattern at the target and forms the aiming light pattern with an aiming mark in a central area of the aiming light pattern and with a pair of aiming light lines that are collinear along the horizontal axis. The aiming light system also enhances the visibility of the aiming mark by optically configuring the aiming mark to be different in brightness, and/or color, and/or size, and/or state of existence relative to a remaining area of the aiming light pattern. The aiming mark of enhanced visibility constitutes a prominent visual indicator of a center zone of the field of view in which the target is positioned over the range of working distances. Thus, the target can be reliably centered in the field of view, which is of particular importance when the field is crowded with targets that are closely adjacent one another, and then electro-optically read by image capture.

Advantageously, the aiming light system includes a pair of aiming light assemblies spaced apart along the horizontal axis at opposite sides of the imaging sensor. The light assemblies include a pair of aiming light sources for emitting a pair of aiming lights along a pair of aiming axes, a pair of aiming source apertures and a pair of aiming lens apertures through which the aiming lights respectively pass along the aiming axes, and a pair of aiming lenses for respectively optically modifying the aiming lights to form the aiming light lines.

In one embodiment, the aiming light sources emit the aiming lights with different colors, e.g., red and blue, and the aiming light lines have inner linear end regions that extend past the imaging axis and that overlap on the target to form the aiming mark with a mixed color, e.g., purple, that is a mixture of the different colors of the aiming lights. Thus, in this embodiment, the aiming mark is optically configured to be different in color relative to the remaining area of the aiming light pattern.

In another embodiment, the aiming source apertures are elongated openings that extend along the horizontal axis and have inner aperture end regions that are closer to the imaging axis and outer aperture end regions that are further away from the imaging axis. The inner aperture end regions and the outer aperture end regions respectively have relatively taller height dimensions and relatively shorter height dimensions as considered along the vertical axis. The aiming light lines have inner linear end regions that extend past the imaging axis and that overlap on the target at the central area of the aiming light pattern to form the aiming mark with a mark height, as considered along the vertical axis, at the central area that is greater than a height of the remaining area of the aiming light pattern. In still another embodiment, the inner aperture end regions and the outer aperture end regions respectively have relatively shorter height dimensions and relatively taller height dimensions as considered along the vertical axis. The aiming light lines have inner linear end regions that extend past the imaging axis and that overlap on the target at the central area of the aiming light pattern to form the aiming mark with a mark height, as considered along the vertical axis, at the central area that is lesser than a height of the remaining area of the aiming light pattern. Thus, in the latter two embodiments, the aiming mark is optically configured to be different in size, e.g., taller or shorter in height, relative to the remaining area of the aiming light pattern.

In a further embodiment, the aiming lenses are optically modified to configure the aiming lights to intersect each other at a distance away from the module. The aiming light lines have inner linear end regions that are spaced apart and away from the imaging axis to form the aiming mark as a gap between the aiming light lines. Thus, in this embodiment, the aiming mark is optically configured to be different in its state of existence relative to the remaining area of the aiming light pattern. In other words, the gap can be considered as a negative or null state, whereas the remaining area of the aiming light pattern can be considered as a positive or non-null state.

In additional embodiments, the aiming lens apertures are openings through which the aiming lights pass and overlap on the target at the central area of the aiming light pattern to form the aiming mark. These openings are optically configured to increase the brightness of the aiming mark at the central area that is greater than a brightness of the remaining area of the aiming light pattern. Thus, the shape of each of these openings can be a single rectangle having a predetermined height, or a single taller rectangle of increased height, or a plurality of spaced-apart rectangles arranged along a row.

Advantageously, the aiming light lines have outer linear end regions that extend along the horizontal axis toward, and that visually indicate, approximate boundary zones of the field of view over the range of working distances. The field of view is generally rectangular and has a horizontal dimension along the horizontal axis. The outer linear end regions have opposite ends that are spaced apart along the horizontal axis by a distance that is slightly less than the horizontal dimension of the field of view over at least part of the range of working distances. This also assists and guides an operator in finding an optimum target reading position. Thus, the center and/or approximate end limits of the field of view are accurately and simultaneously indicated over the range of working distances despite a horizontal offset between the imaging and aiming light systems of the module. Advantageously, the aiming axes and the imaging axis generally lie in a common plane and are generally parallel to one another. The aiming light lines increase in length, and the field of view increases proportionally in area, in a direction away from the module.

In accordance with another feature of this disclosure, the aforementioned imaging module is mounted in a housing of an imaging reader that has a light-transmissive window. The imaging sensor senses light returning from the target through the window, and the aiming light pattern is directed through the window at the target. The housing is preferably embodied as a portable, point-of-transaction, gun-shaped, handheld housing, but could be embodied as a handheld, box-shaped housing, or any other configuration including a hands-free configuration.

In accordance with yet another feature of this disclosure, a method of reading a target by image capture over a range of working distances away from an imaging reader, is performed by sensing light returning from the target along an imaging axis over a field of view that extends along mutually orthogonal, horizontal and vertical axes that are generally perpendicular to the imaging axis, by directing an aiming light pattern at the target, by forming the aiming light pattern with an aiming mark in a central area of the aiming light pattern and with a pair of aiming light lines that are collinear along the horizontal axis, and by enhancing the visibility of the aiming mark, e.g., by optically configuring the aiming mark to be different in at least one of brightness, and/or color, and/or size, and/or state of existence relative to a remaining area of the aiming light pattern. The aiming mark of enhanced visibility constitutes a prominent visual indicator of a center zone of the field of view in which the target is positioned over the range of working distances.

Figure 5:
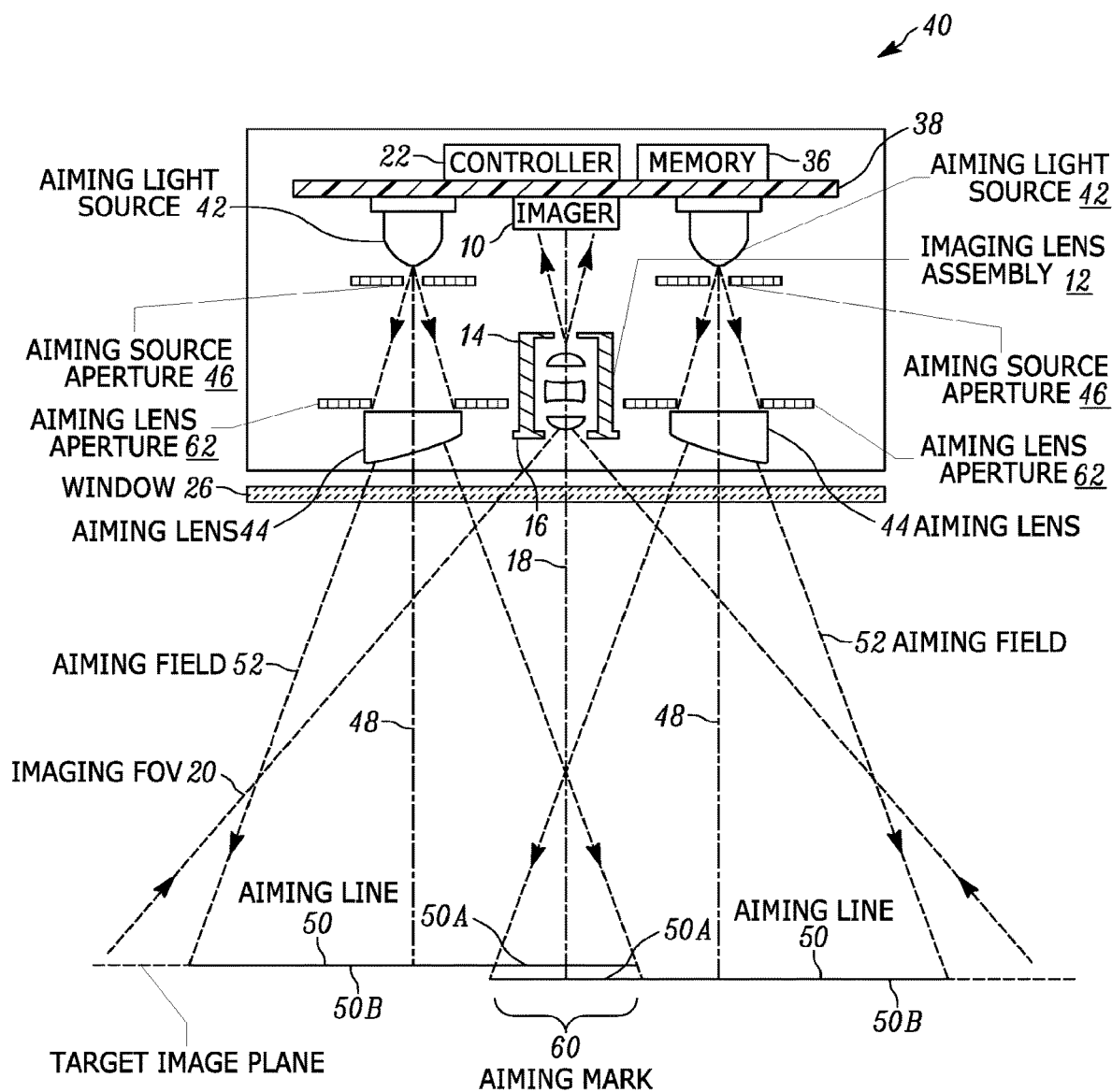
FIG. 5 is a diagrammatic view of components of the imaging and aiming light systems of the reader of FIG. 1.

Turning now to the drawings, reference numeral 30 in FIG. 1 generally identifies a handheld imaging reader for electro-optically reading targets, such as bar code symbols or like indicia. The reader 30 includes a housing 32 in which an imaging or scan engine or module 40, as described in detail below in connection with FIG. 5, is mounted. The housing 32 includes a generally elongated handle or lower handgrip portion 28 and a barrel or upper body portion or top 24 having a front end at which a light-transmissive window 26 is located. The cross-sectional dimensions and overall size of the handle 28 are such that the reader 30 can conveniently be held in an operator's hand. The body and handle portions 24, 28 may be constructed of a lightweight, resilient, shock-resistant, self-supporting material, such as a synthetic plastic material. The plastic housing 32 may be injection molded, but can also be vacuum-formed or blow-molded to form a thin hollow shell which bounds an interior space whose volume is sufficient to contain the various components of this reader 30. A manually actuatable trigger 34 is mounted in a moving relationship on the handle 28 in a forward-facing region of the reader 30. An operator's forefinger is used to actuate the reader 30 to initiate reading by depressing the trigger 34. Although the housing 32 is illustrated as a portable, point-of-transaction, gun-shaped, handheld housing, this is merely exemplary, because the housing could also be embodied as a handheld, box-shaped housing, or with any other configuration including a hands-free configuration.

Figure 2:
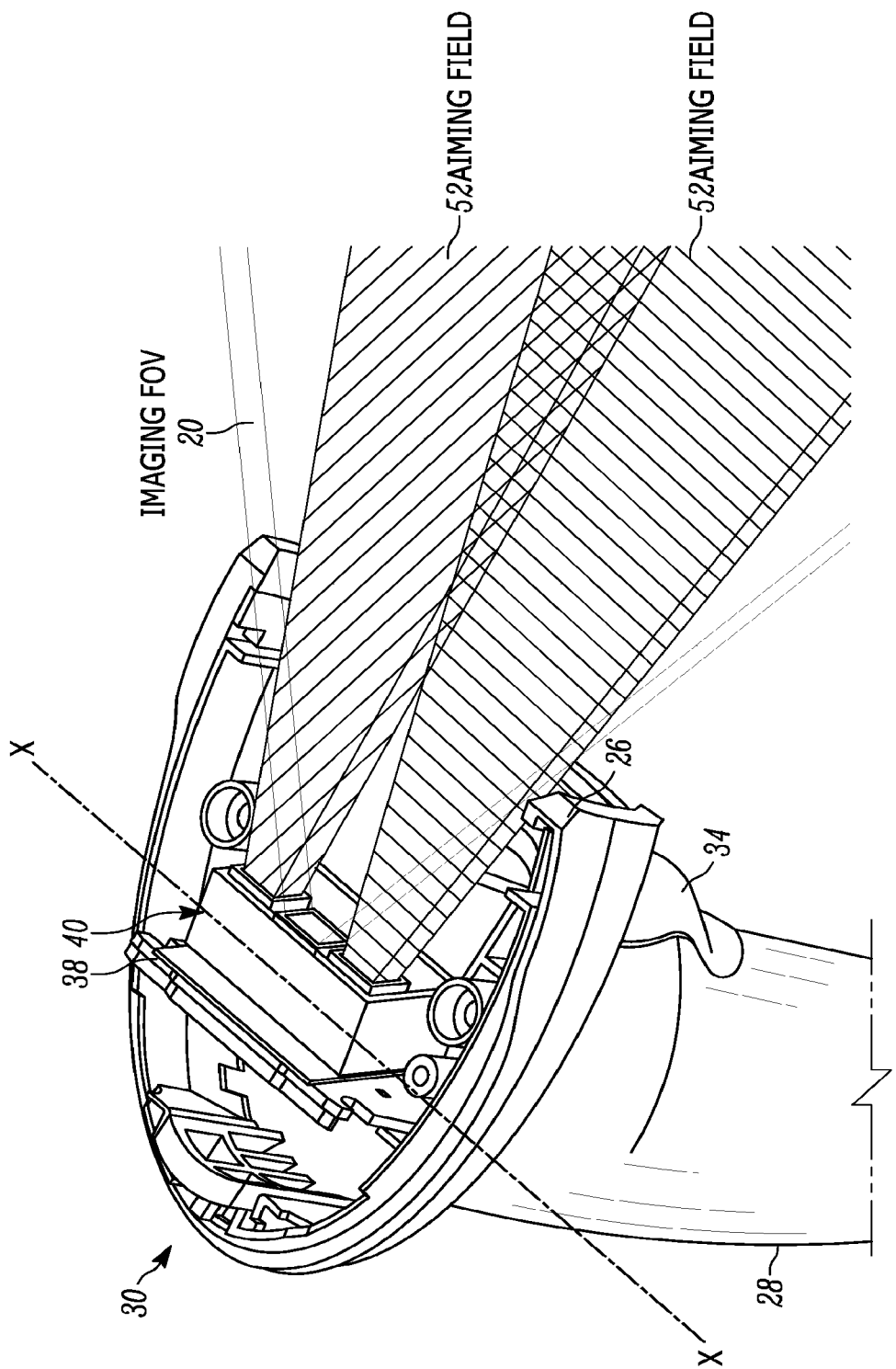
FIG. 2 is a perspective view of the reader of FIG. 1, with its top removed to illustrate components of imaging and aiming light systems of the reader in accordance with this disclosure.
Figure 3:
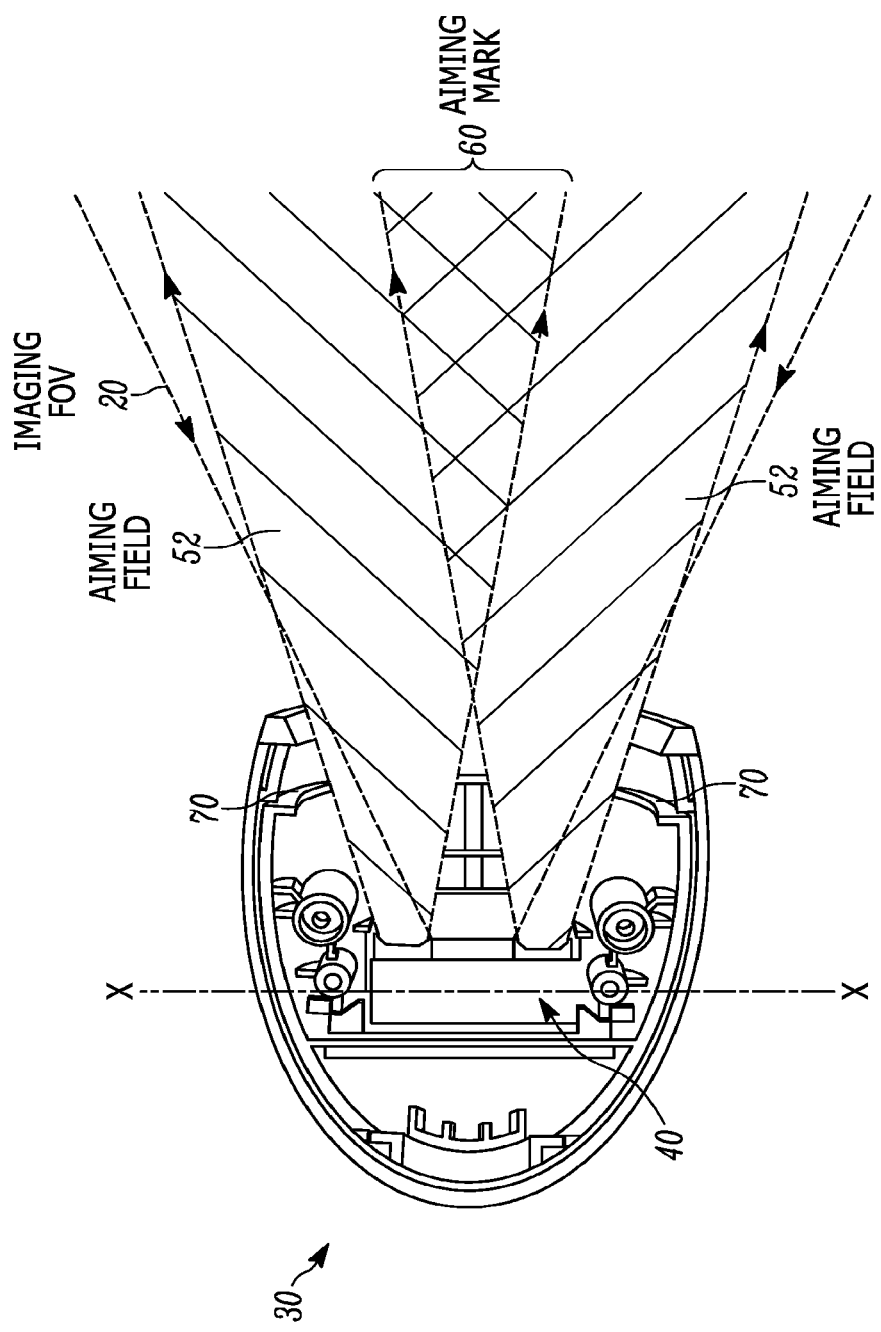
FIG. 3 is a top plan view of the reader of FIG. 2.

FIGS. 2-3 depict the reader 30 with the top 24 removed and exposing the module 40 therein. As best shown in FIG. 5, the module 40 includes an imaging system having a solid-state imager 10, and an imaging lens assembly 12 mounted in a tubular holder 14 that has a circular imaging aperture 16. The imager 30 is a two-dimensional, charge coupled device (CCD) array or a complementary metal oxide semiconductor (CMOS) array of cells or sensors having either a global or a rolling shlutter. Preferably, for low cost reasons, a CMOS imager is advantageously used with a rolling shutter. The imager 10 and imaging lens 12 are preferably aligned along a centerline or an optical imaging axis 18 generally centrally located within the upper body portion 24.

In operation, the imaging system captures return light passing through the window 26 along the imaging axis 18 centered in an imaging field of view 20 of the imaging lens assembly 12 from a target located in a range of working distances away from the window 26. The imager 10 is advantageously positioned closer to a rear wall of the upper body portion 24 than to a front of the housing in order to enlarge the imaging field of view 20 in the near range of working distances close to the reader 30. The imaging lens 32 preferably comprises one or more fixed-focus lenses, preferably a Cooke triplet, having an imaging plane at which the target is best focused and imaged onto the imager 10. The field of view 20 is generally rectangular and extends along the illustrated mutually orthogonal, horizontal (X-X) and vertical (Y-Y) axes that are generally perpendicular to the imaging axis 18. The sensors produce electrical signals corresponding to a two-dimensional array of pixel information for an image of the target. The electrical signals are processed by a controller or programmed microprocessor 22 into data indicative of the target being read. The controller 22 is connected to a memory 36 for data retrieval and storage. The controller 22 and the memory 36 are mounted on a printed circuit board 38, which need not be mounted in the module 40 as shown, but could be mounted remotely from the module 40.

The imaging system is capable of acquiring a full image of the target under various lighting conditions. A non-illustrated illumination system may also be mounted on the module 40 to provide illumination light to illuminate the target. Exposure time is controlled by the controller 22. Resolution of the array can be of various sizes although a VGA resolution of 640×480 pixels may be used to minimize cost.

An aiming light system, including a pair of aiming light assemblies, is supported on the module 40, and is offset from the imaging system. The aiming system is operative for projecting on the target various aiming light patterns 100 (see FIGS. 6B, 7B, 8B and 9B), as described in detail below. The aiming light assemblies are spaced apart along the horizontal axis (X-X) at opposite sides of the imaging sensor 10. Each aiming light assembly includes an aiming light source or light emitting diode (LED) 42, preferably, but not necessarily, mounted on the circuit board 38; a generally linear, elongated aiming source aperture 46 that extends along the horizontal axis (X-X) in front of the LED 42; an aiming lens 44, preferably a toroidal lens, mounted away from its respective LED 42; and an aiming lens aperture 62 preferably situated upstream of the aiming lens 44. Each LED 42, source aperture 46, lens aperture 62, and lens 44 are centered and lie along a respective aiming axis 48. The aiming axes 48 generally lie in a common plane and are generally parallel to one another. As shown, the LEDs 42 and the sensor 10 are preferably mounted along a common horizontal axis. Advantageously, the imaging axis 18 lies in the same plane and is generally parallel to the aiming axes 48.

The aiming light assemblies are operative for directing the aiming light emitted from each LED 42 through the respective source aperture 46, the respective lens aperture 62, and the respective lens 44 along the respective aiming axis 48 over an aiming field 52 that is centered on the respective aiming axis 48 at the target. On the target, these aiming fields 52 describe a pair of aiming light lines 50, which are collinear along the horizontal axis (X-X). As shown in FIG. 5, the aiming light lines 50 have inner linear end regions 50A that extend past the imaging axis 18 and that overlap on the target to form an aiming mark 60. Thus, the operator can position the aiming mark 60 on the target, and the target will be substantially centered in the imaging field of view 20 despite the offset between the imaging and aiming light systems. This is helpful during a picklist mode of operation when choosing between multiple targets that are situated close together in the field of view.

In accordance with this disclosure, the aiming light system enhances the visibility of the aiming mark 60 by optically configuring the aiming mark 60 to be different, as described below, in brightness, and/or color, and/or size, and/or state of existence relative to a remaining area of the aiming light pattern. The aiming mark 60 of enhanced visibility constitutes a prominent visual indicator of a center zone of the field of view 20 in which the target is positioned over the range of working distances.

Figure 6A:
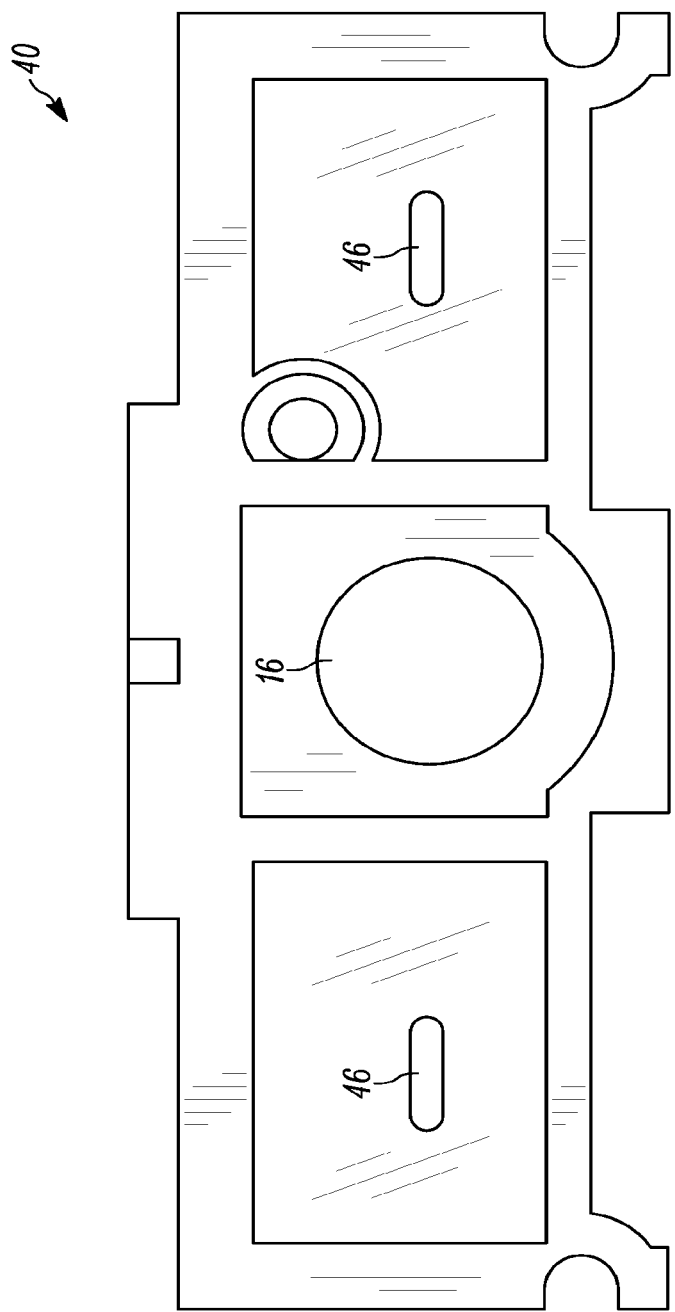
FIG. 6A is an enlarged, elevational view of an upper portion of the imaging module depicting aiming source apertures of the aiming light system that are optically configured in accordance with a first embodiment of this disclosure.
Figure 6B:
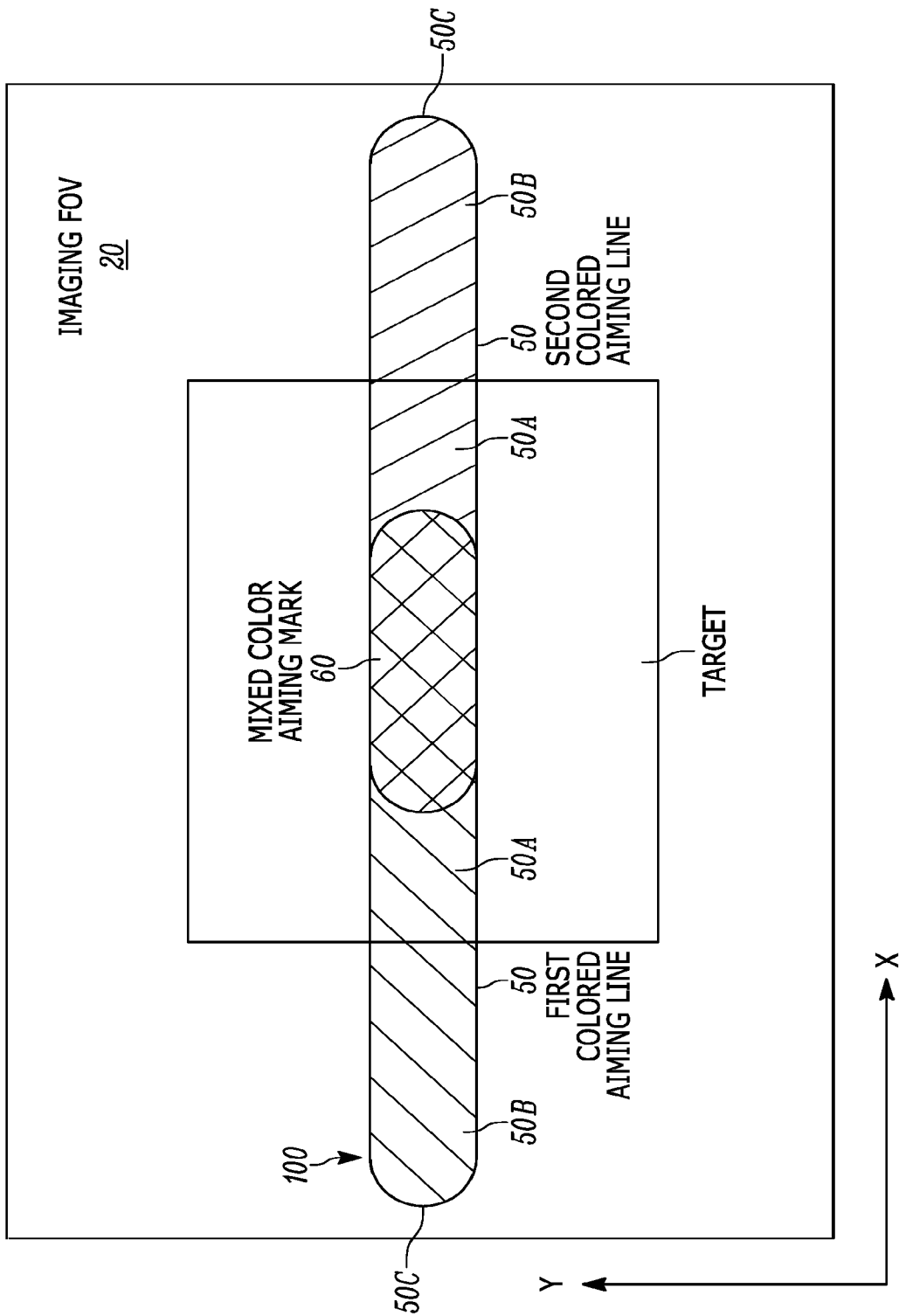
FIG. 6B is an enlarged, diagrammatic view of the aiming light pattern produced by the aiming light system embodiment of FIG. 6A.
Figure 7A:
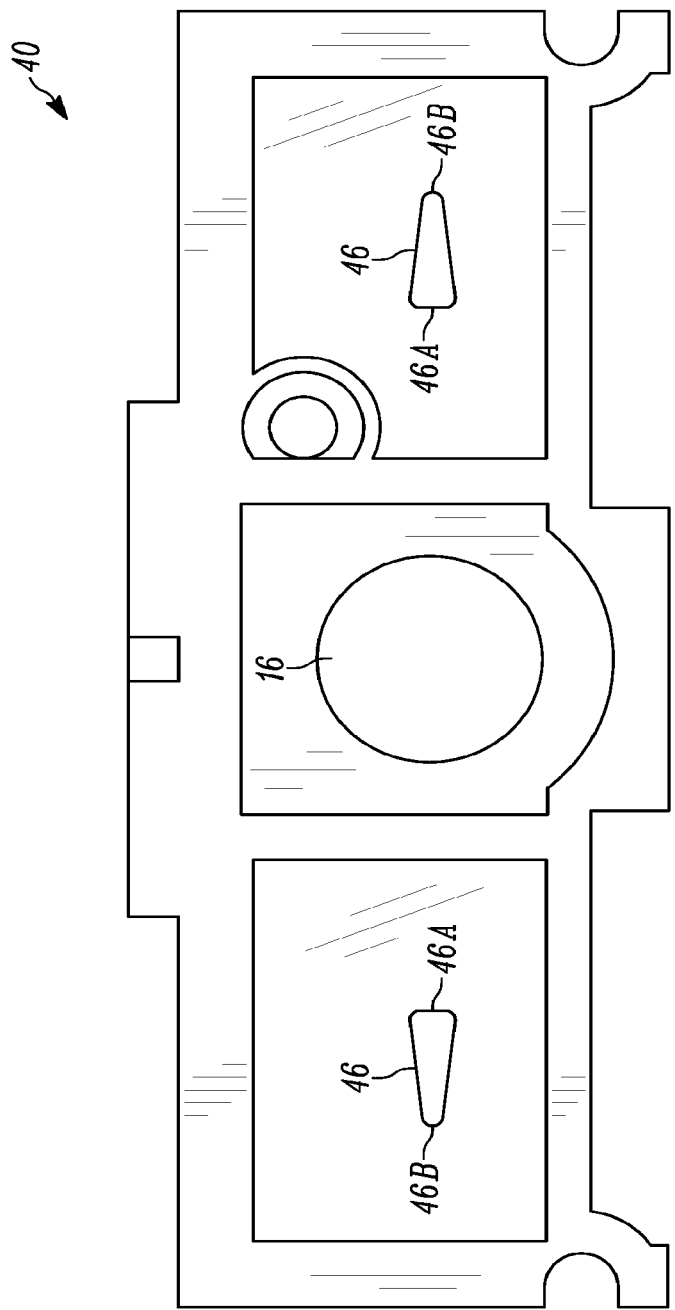
FIG. 7A is an enlarged, elevational view of an upper portion of the imaging module depicting aiming source apertures of the aiming light system that are optically configured in accordance with a second embodiment of this disclosure.
Figure 8A:
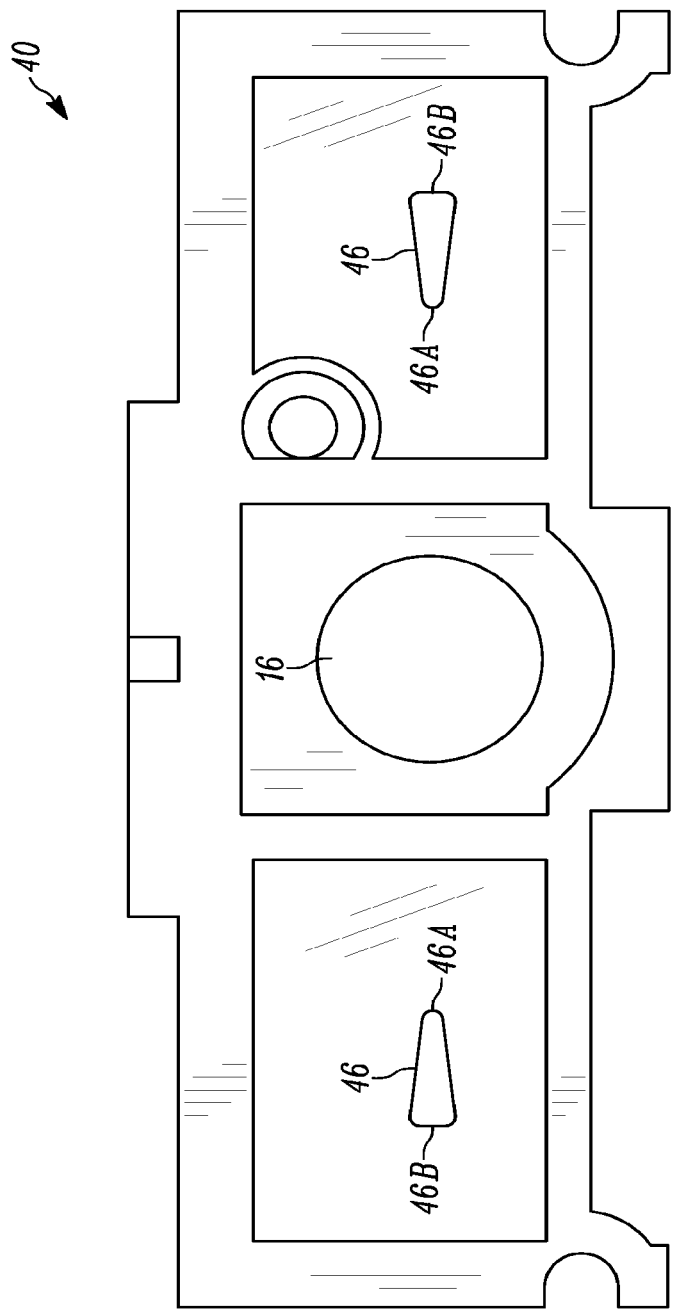
FIG. 8A is an enlarged, elevational view of an upper portion of the imaging module depicting aiming source apertures of the aiming light system that are optically configured in accordance with a third embodiment of this disclosure.

A front elevational view of an upper portion of the module 40 is depicted in FIGS. 6A, 7A, and 8A. The aiming source apertures 46 are situated at opposite sides of the imaging aperture 16. In a first embodiment, as shown in FIGS. 6A-6B, the aiming light sources 42 emit the aiming lights with different colors, e.g., red and blue, through the aiming source apertures 46. As illustrated, the aiming source apertures 46 are generally rounded, rectangular openings of generally uniform height, as considered along the vertical axis (Y-Y). The aiming light lines 50 have inner linear end regions 50A that extend past the imaging axis 18 and that overlap on the target to form the aiming mark 60 with a mixed color, e.g., purple, that is a mixture of the different colors of the aiming lights. Thus, in the first embodiment, the aiming mark 60 is optically configured to be different in color relative to the remaining area of the aiming light pattern 100. It will be understood that the colors red and blue are merely exemplary and that other colors could be used.

Figure 7B:
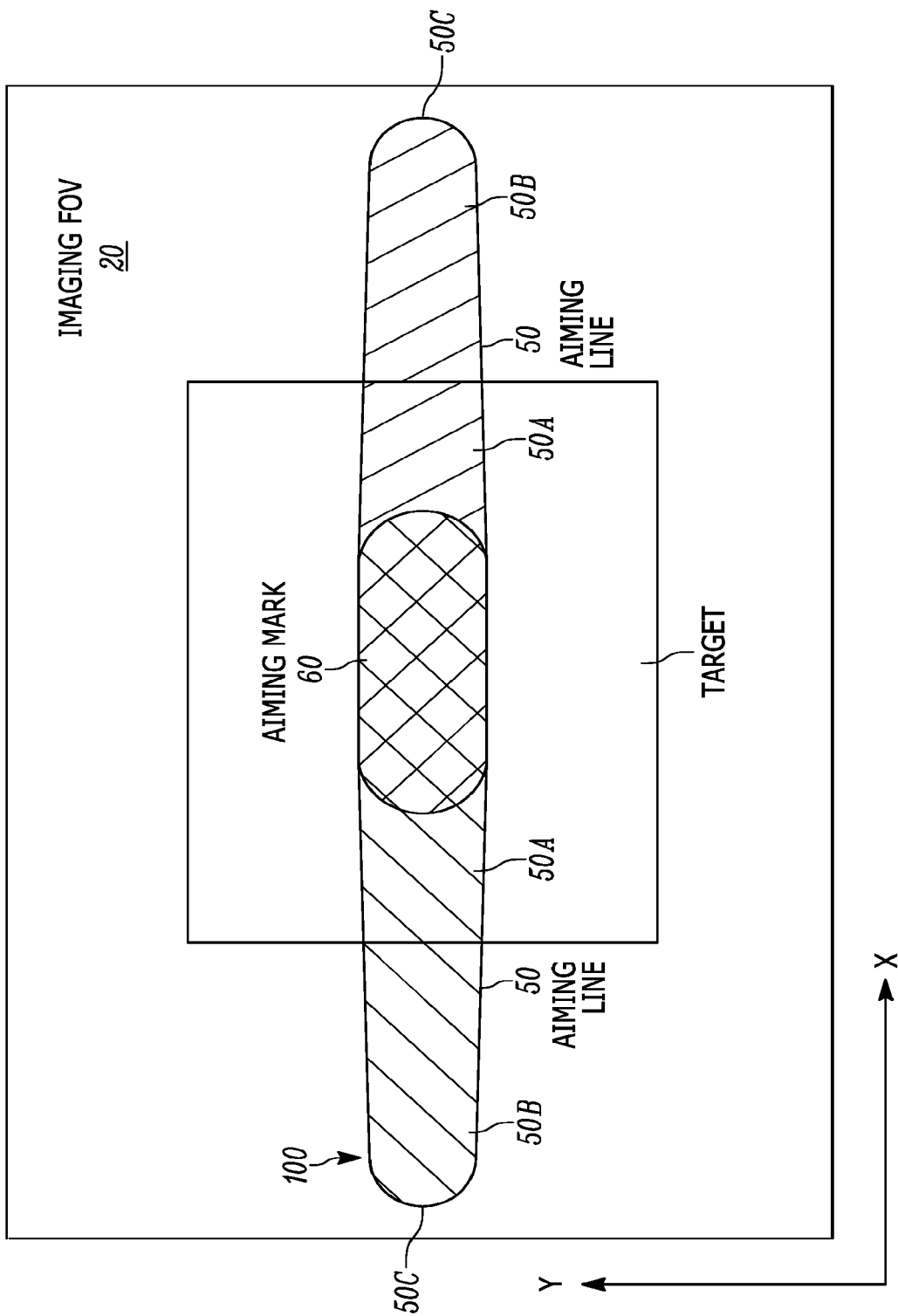
FIG. 7B is an enlarged, diagrammatic view of the aiming light pattern produced by the aiming light system embodiment of FIG. 7A.

In a second embodiment, as shown in FIGS. 7A-7B, the aiming source apertures 46 are generally rounded, isosceles trapezoidal openings that are elongated and extend along the horizontal axis (X-X) and have inner aperture end regions 46A that are closer to the imaging axis 18 and outer aperture end regions 46B that are further away from the imaging axis 18. The inner aperture end regions 46A and the outer aperture end regions 46B respectively have relatively taller height dimensions and relatively shorter height dimensions as considered along the vertical axis (Y-Y). The aiming light lines 50 have inner linear end regions 50A that extend past the imaging axis 18 and that overlap on the target at the central area of the aiming light pattern 100 to form the aiming mark 60 with a mark height, as considered along the vertical axis (Y-Y), at the central area that is greater than a height of the remaining area of the aiming light pattern 100. Thus, in the second embodiment, the aiming mark 60 is optically configured to be different in size, e.g., taller in height, relative to the remaining area of the aiming light pattern 100. The taller or fatter aiming mark 60 prominently indicates the center zone of the field of view 20.

Figure 8B:
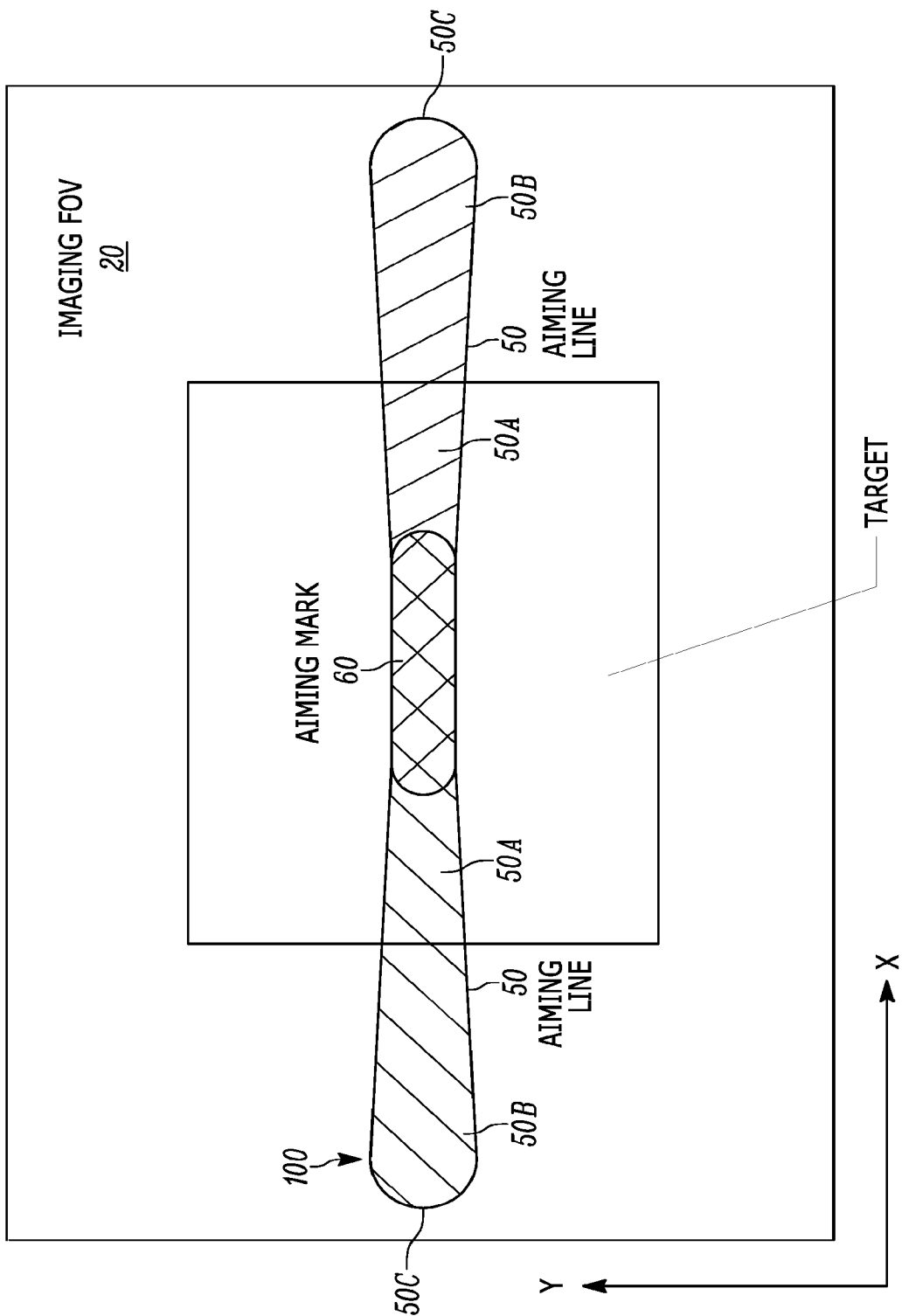
FIG. 8B is an enlarged, diagrammatic view of the aiming light pattern produced by the aiming light system embodiment of FIG. 8A.

In a third embodiment, as shown in FIGS. 8A-8B, the inner aperture end regions 46A and the outer aperture end regions 46B respectively have relatively shorter height dimensions and relatively taller height dimensions as considered along the vertical axis (Y-Y). The aiming light lines 50 have inner linear end regions 50A that extend past the imaging axis 18 and that overlap on the target at the central area of the aiming light pattern 100 to form the aiming mark 60 with a mark height, as considered along the vertical axis (Y-Y), at the central area that is lesser than a height of the remaining area of the aiming light pattern 100. Thus, in the third embodiment, the aiming mark 60 is optically configured to be different in size, e.g., shorter in height, relative to the remaining area of the aiming light pattern 100. The shorter or thinner aiming mark 60 prominently indicates the center zone of the field of view 20.

Figure 9A:
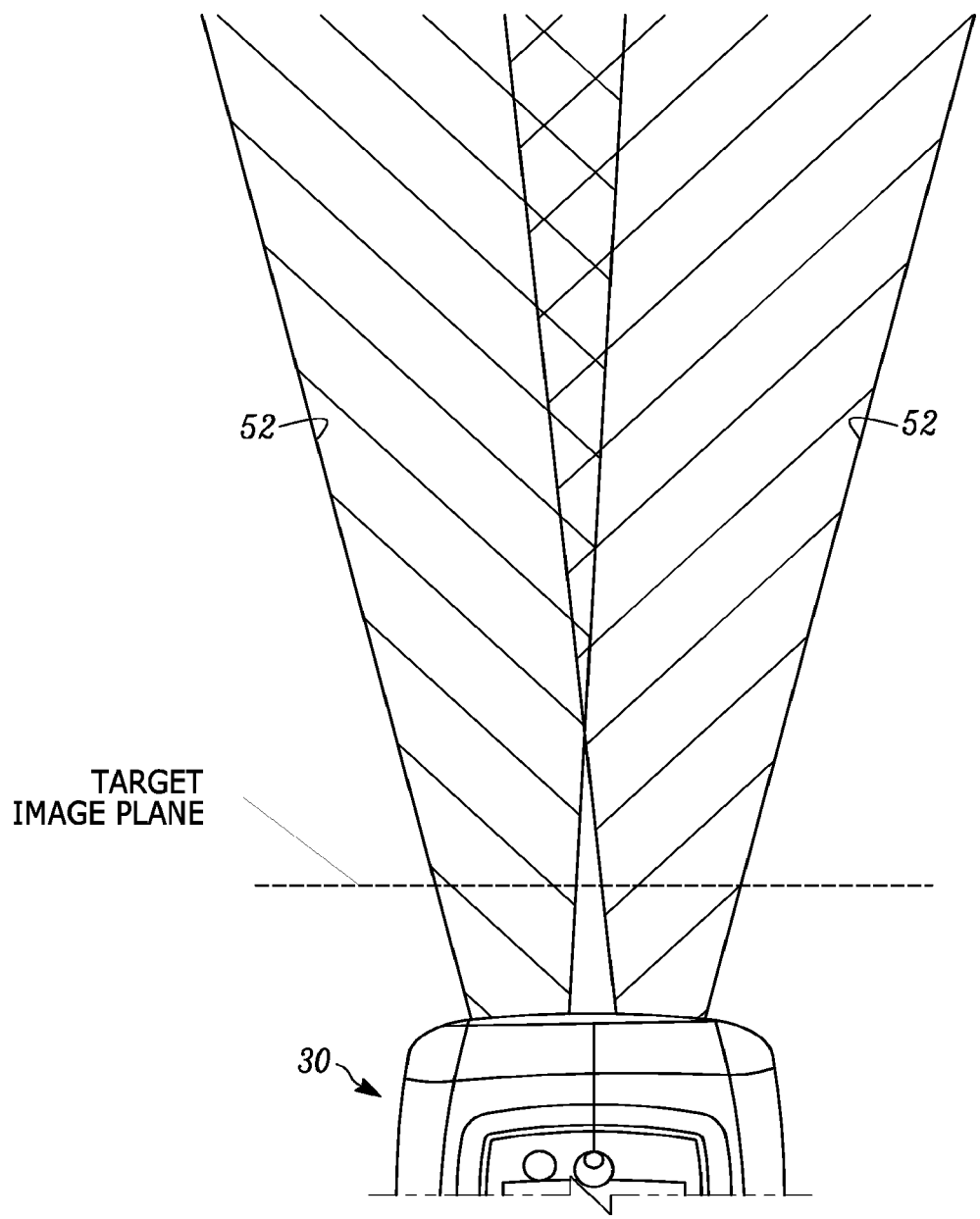
FIG. 9A is an overhead view of an upper portion of the imaging reader depicting how the aiming light sources of the aiming light system are configured in accordance with a fourth embodiment of this disclosure.
Figure 9B:
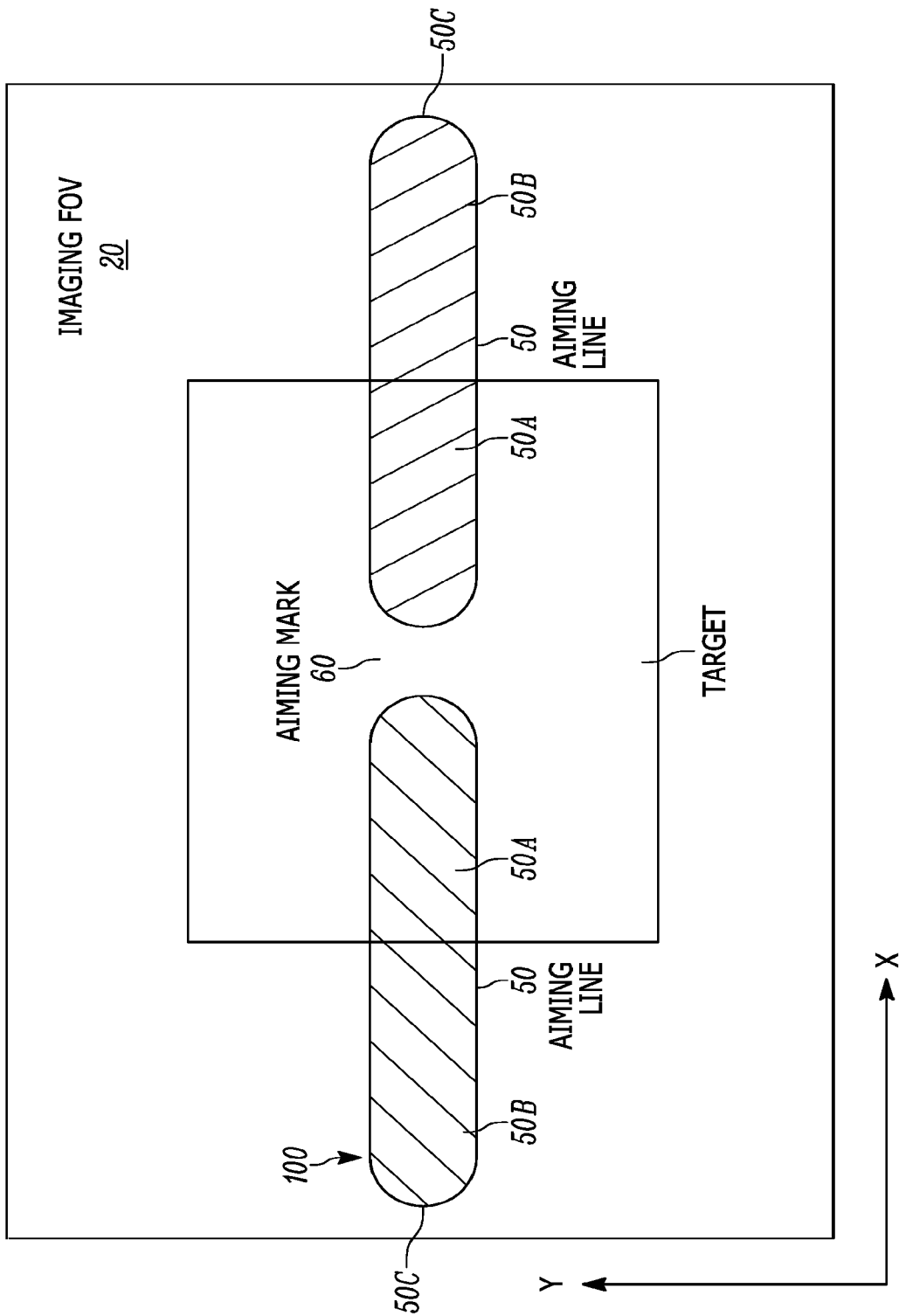
FIG. 9B is an enlarged, diagrammatic view of the aiming light pattern produced by the aiming light system embodiment of FIG. 9A.

In a fourth embodiment, as shown in FIGS. 9A-9B, the aiming lenses 44 are optically modified, for example, by changing the curvatures of their exit surfaces, to configure the aiming lights to intersect each other at a distance away from the reader 30. In a near range of working distances, e.g., up to about six inches away from the reader 30, for example, at the indicated target image plane, the aiming light lines 50 have inner linear end regions 50A that are spaced apart and away from the imaging axis 18 to form the aiming mark 60 as a gap between the aiming light lines 50. Thus, in the fourth embodiment, the aiming mark 60 is optically configured to be different in its state of existence relative to the remaining area of the aiming light pattern 100. In other words, the gap can be considered as a negative or null state of existence, whereas the remaining area of the aiming light pattern 100 can be considered as a positive or non-null state of existence.

Figure 10A:
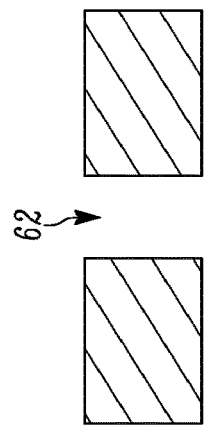
FIG. 10A is an enlarged, elevational view of an upper portion of the imaging module depicting aiming lens apertures of the aiming light system that are optically configured in accordance with a fifth embodiment of this disclosure.
Figure 10B:
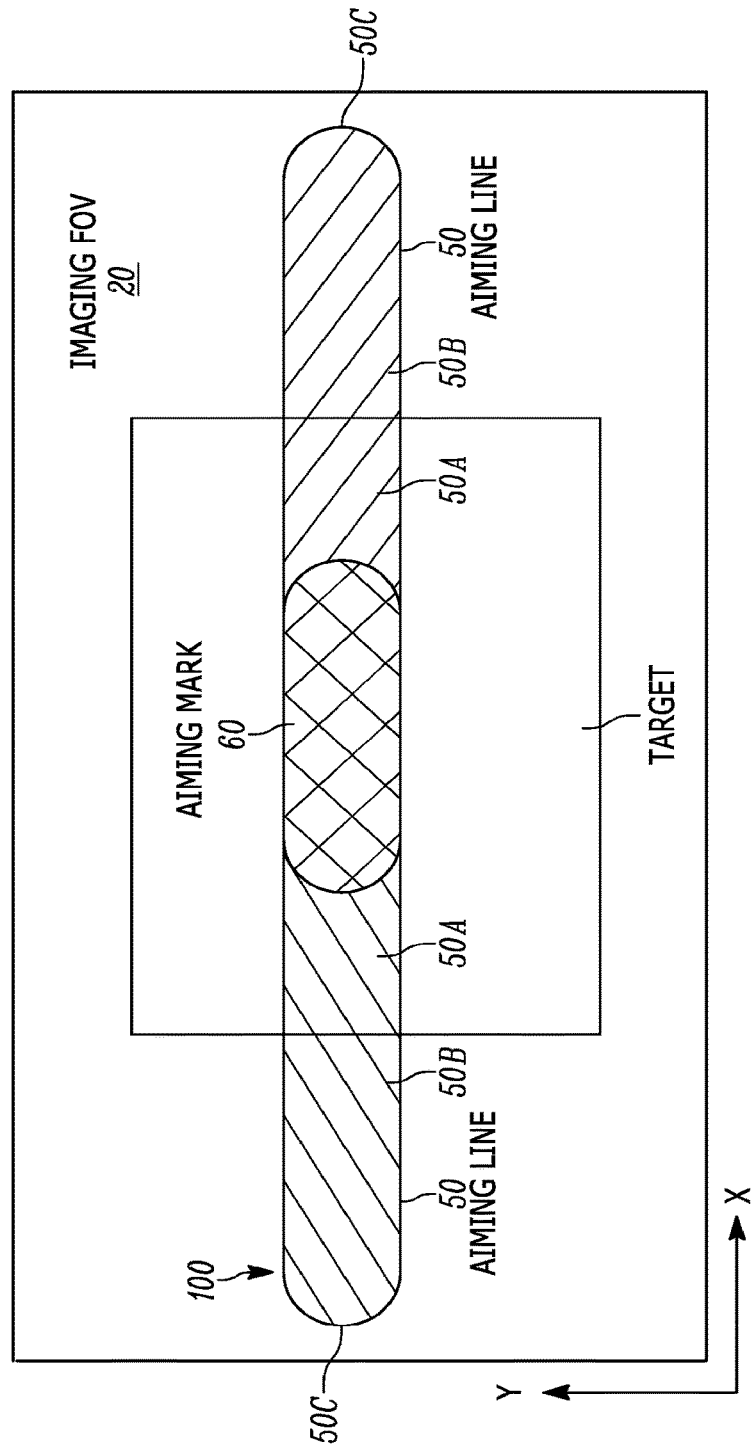
FIG. 10B is an enlarged, diagrammatic view of the aiming light pattern produced by the aiming light system embodiment of FIG. 10A.
Figure 11A:
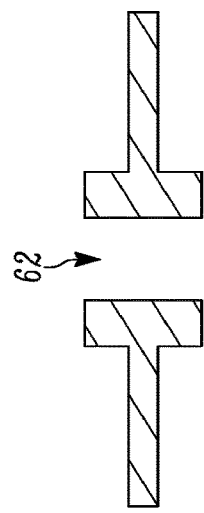
FIG. 11A is an enlarged, elevational view of an upper portion of the imaging module depicting aiming lens apertures of the aiming light system that are optically configured in accordance with a sixth embodiment of this disclosure.
Figure 11B:
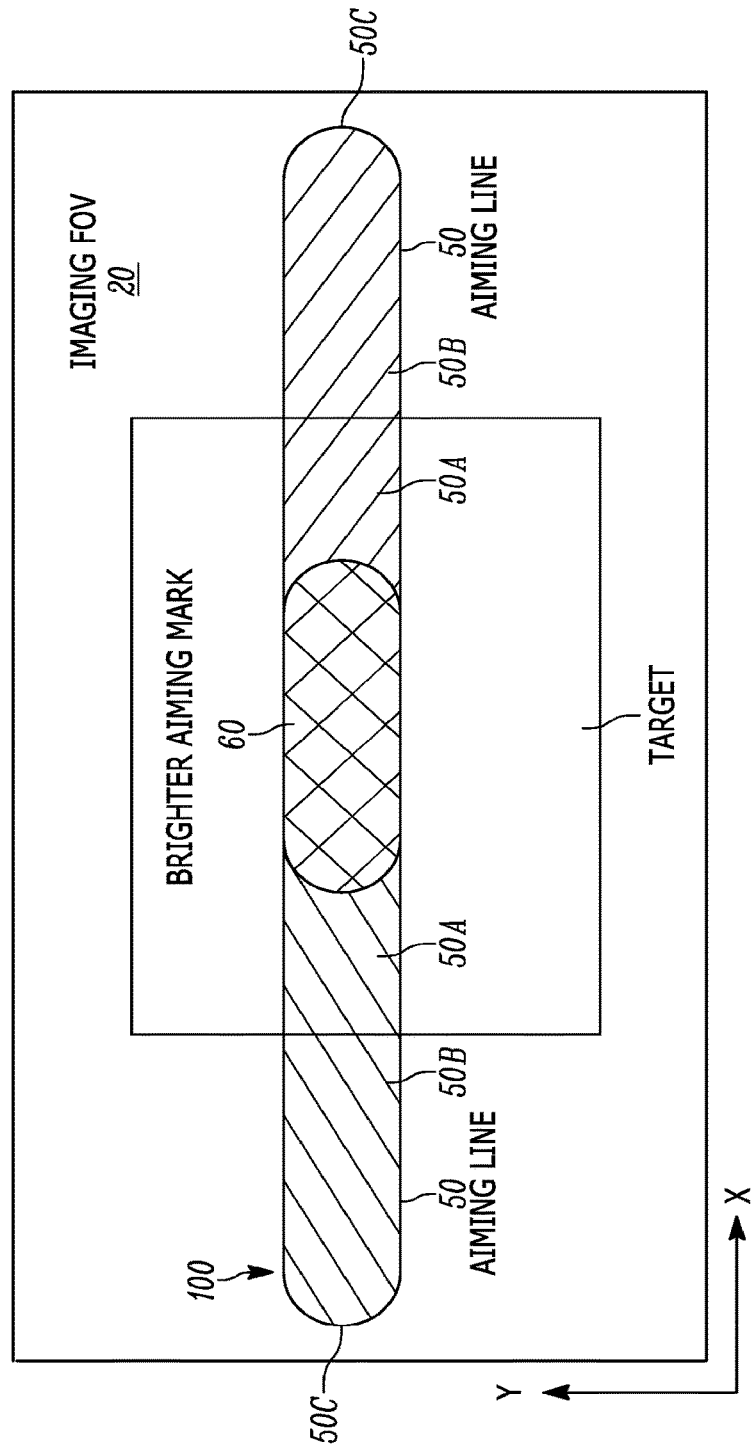
FIG. 11B is an enlarged, diagrammatic view of the aiming light pattern produced by the aiming light system embodiment of FIG. 11A.
Figure 12A:
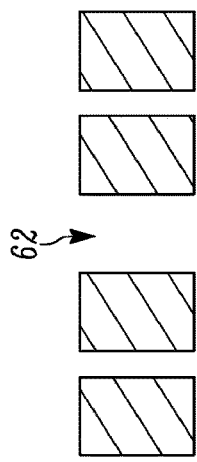
FIG. 12A is an enlarged, elevational view of an upper portion of the imaging module depicting aiming lens apertures of the aiming light system that are optically configured in accordance with a seventh embodiment of this disclosure.
Figure 12B:
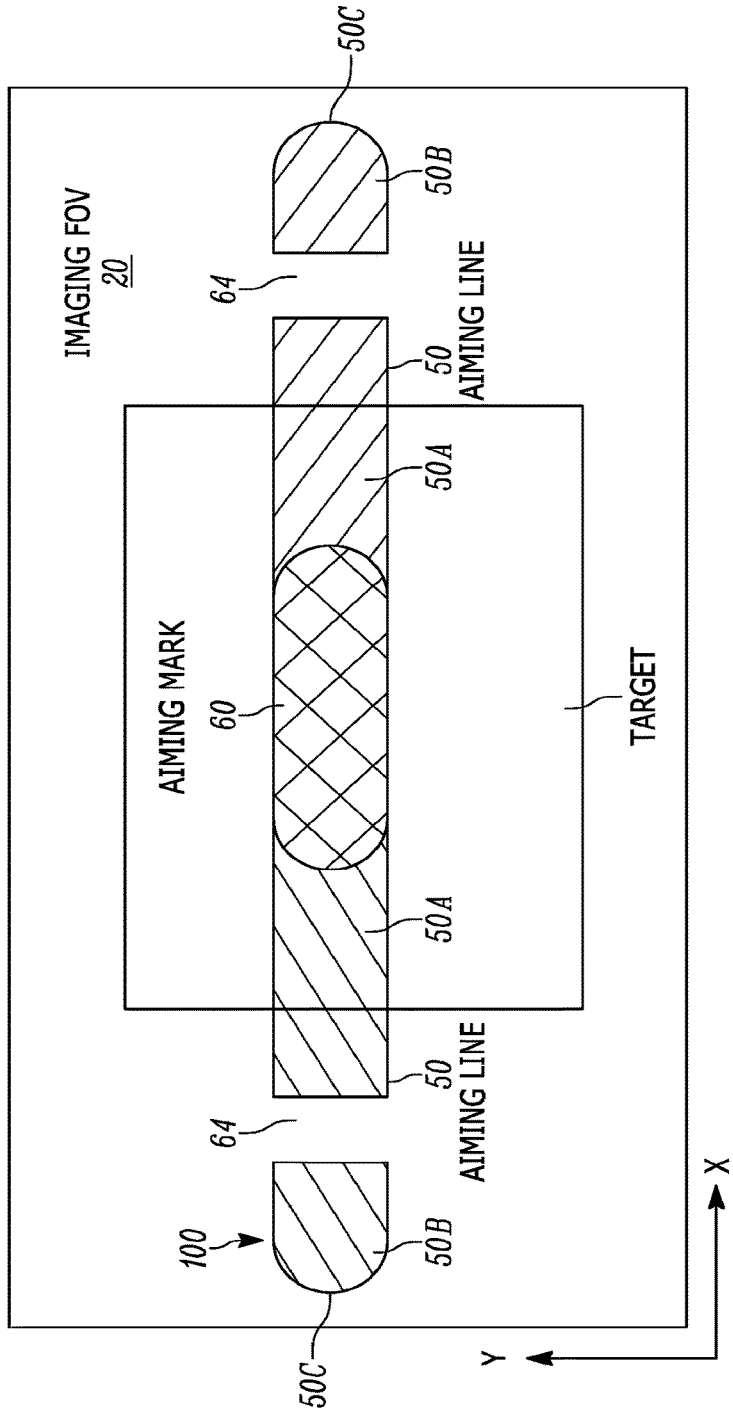
FIG. 12B is an enlarged, diagrammatic view of the aiming light pattern produced by the aiming light system embodiment of FIG. 12A.

In a fifth embodiment, as shown in FIGS. 10A-10B, each aiming lens aperture 62 is a single rectangular opening (FIG. 10A) through which each aiming light passes. As shown in FIG. 10B, the aiming lights overlap on the target at the central area of the aiming light pattern to form the aiming mark 60. Each single opening is optically configured to increase the brightness of the aiming mark 60 at the central area that is greater than a brightness of the remaining area of the aiming light pattern. In a sixth embodiment, as shown in FIGS. 11A-11B, each aiming lens aperture 62 is a single rectangular opening of greater height (FIG. 11A) as compared to that of the opening in FIG. 10A. In this sixth embodiment, the brightness of the aiming mark 60 due to the taller opening is greater than the brightness of the aiming mark 60 of the fifth embodiment. In a seventh embodiment, as shown in FIGS. 12A-12B, each aiming lens aperture 62 is configured as a plurality of openings that are separated from one another by vertical slits. In this seventh embodiment, a plurality of highly visible gaps 64 (FIG. 12B) are formed in the aiming light pattern. Thus, the shape of each of these openings can be a single rectangle having a predetermined height, or a single taller rectangle of increased height, or a plurality of spaced-apart rectangles arranged along a row. Each aiming lens aperture 62 can be formed as an outline on an entrance surface of a respective aiming lens 44, or as a patterned coating or texture on the entrance surface, or as a separate aperture baffle element.

In all of the embodiments, the aiming light lines 50 also have outer linear end regions 50B that extend along the horizontal axis (X-X) toward, and that visually indicate, approximate boundary zones or end limits of the field of view 20 over the range of working distances. Thus, the operator is guided to position the outer linear end regions 50B on the target, such that the target will be substantially contained entirely within the imaging field of view 20 despite the offset between the imaging and aiming systems.

Figure 4:
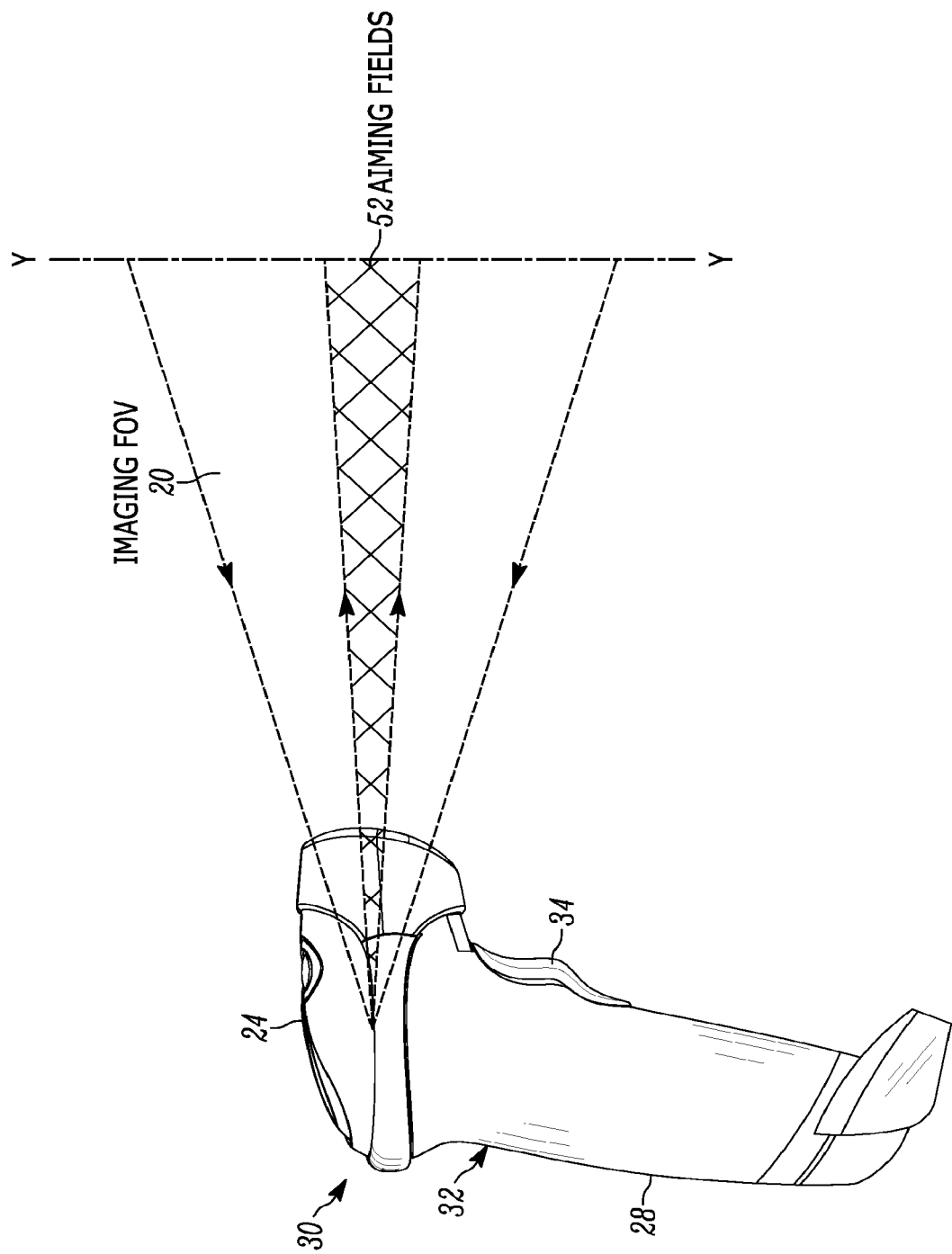
FIG. 4 is a side elevational view of the reader of FIG. 2.

As best seen in FIGS. 3-4, the aiming light lines 50 increase in length, and the field of view 20 increases proportionally in area, in a direction away from the reader 30. As seen in FIGS. 6B, 7B, 8B, and 9B, the field of view 20 has a horizontal dimension along the horizontal axis (X-X), and the outer linear end regions 50B have opposite edges or ends 50C that are spaced apart along the horizontal axis (X-X) by a distance that closely approximates the horizontal dimension over at least part of the range of working distances. For example, this distance can be slightly less, e.g., 10%-30% less, than the horizontal dimension over at least part of the range of working distances. A pair of light baffles 70 (see FIG. 3) may be provided within the reader housing to create cleaner outside edges 50C for the aiming light pattern 100. This distance is advantageously optimized to read some difficult-to-read targets in a selected part of the working distance range, especially in the near part of said range, which is ideal for reading such difficult-to-read targets.

By way of numerical example, in the first embodiment of FIGS. 6A-6B, at about 5 inches away from the window 26, the aiming light pattern 100, i.e., the distance between the opposite ends 50C of the outer linear end regions 50B, is about 5 inches in length along the horizontal axis (X-X) and about 0.5 inches in height along the vertical axis (Y-Y), and the aiming mark 60 is about 1.5 inches in length along the horizontal axis (X-X) and also about 0.5 inches in height along the vertical axis (Y-Y), and the horizontal dimension of the field of view 20 is slightly more than 5 inches. Thus, once the target is covered by the aiming light pattern 100, the target is guaranteed to be within the field of view 20. As the distance between the reader 30 and the target decreases, the aiming mark 60 decreases in size until it shrinks to a spot when the target comes close or touches the reader. This helps to center the target when reading in the near range despite the offset between the imaging and aiming systems.

In the foregoing specification, specific embodiments have been described. However, one of ordinary skill in the art appreciates that various modifications and changes can be made without departing from the scope of the invention as set forth in the claims below. For example, the visibility of the aiming mark can be further enhanced by combining features from the embodiments. Thus, the different colors of the aiming lights emitted by the aiming light sources 42 and described in connection with the first embodiment can be used to advantage with any of the other embodiments. In addition, the shapes of the aiming source apertures 46 described in connection with the second and third embodiments can be used to advantage with any of the other embodiments. Furthermore, the optical configuration of the aiming lenses 44 described in connection with the fourth embodiment can be used to advantage with any of the other embodiments. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A barcode reader comprising:
   a housing having a handgrip portion and an upper body portion;
   a first printed circuit board (PCB) extending into the upper body portion; and
   an imaging module positioned within the upper body portion, the imaging module including:
      an imaging system having an imager and an imaging lens assembly, the imaging system having a field of view with a central imaging axis passing through a window in the upper body portion and lying on a horizontal plane;
      an aiming light system configured to emit an aiming light pattern, the aiming light system offset from the imaging system along the horizontal plane; and
      a second PCB,
   wherein the first PCB is positioned at an oblique angle relative to the central imaging axis, and
   wherein both of the imager and a portion of the aiming light system are positioned on the second PCB.

2. The barcode reader of claim 1, wherein the imaging module further includes an illumination system configured to provide illumination light to illuminate a target.

3. The barcode reader of claim 1, wherein the imaging module further includes a first side and a diametrically opposed second side, the first side facing the window and a front end of the upper body portion, the second side facing the first PCB and a rear end of the upper body portion, and
   wherein the imaging module is positioned within the upper body portion such a first distance from the second side of the imaging module to the front end of the upper body portion is greater than a second distance from the second side of the imaging module to the first PCB.

4. The barcode reader of claim 1, wherein the aiming light system is configured to emit the aiming light pattern along the horizontal plane.

5. A barcode reader comprising:
   a housing having a handgrip portion and an upper body portion;
   a first printed circuit board (PCB) extending into the upper body portion; and
   an imaging module positioned within the upper body portion, the imaging module including:
      a first side and a diametrically opposed second side, the first side facing the window and a front end of the upper body portion, the second side facing the first PCB and a rear end of the upper body portion;
      an imaging system having an imager and an imaging lens assembly, the imaging system having a field of view with a central imaging axis passing through a window in the upper body portion and lying on a horizontal plane; and
      an aiming light system configured to emit an aiming light pattern, the aiming light system offset from the imaging system along the horizontal plane,
   wherein the first PCB is positioned at an oblique angle relative to the central imaging axis, and
   wherein the imaging module is positioned within the upper body portion such a first distance from the second side of the imaging module to the front end of the upper body portion is greater than a second distance from the second side of the imaging module to the first PCB.

6. The barcode reader of claim 5, wherein the aiming light system is configured to emit the aiming light pattern along the horizontal plane.

7. The barcode reader of claim 5, wherein the imaging module further includes an illumination system configured to provide illumination light to illuminate a target.

* * * * *